United States Patent
Wubete et al.

(10) Patent No.: US 12,052,166 B2
(45) Date of Patent: Jul. 30, 2024

(54) PREDICTING IMPENDING CHANGE TO INTERIOR GATEWAY PROTOCOL (IGP) METRICS

(71) Applicant: Ciena Corporation, Hanover, MD (US)

(72) Inventors: Bruck Wubete, Ottawa (CA); Thomas Triplet, Manotick (CA); Babak Esfandiari, Ottawa (CA); Thomas Kunz, Ottawa (CA); David Côté, Gatineau (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/992,297

(22) Filed: Nov. 22, 2022

(65) Prior Publication Data
US 2024/0171505 A1   May 23, 2024

(51) Int. Cl.
*H04L 45/28*     (2022.01)
*H04L 41/16*     (2022.01)
*H04L 43/0817*   (2022.01)
*H04L 45/00*     (2022.01)

(52) U.S. Cl.
CPC .............. *H04L 45/28* (2013.01); *H04L 41/16* (2013.01); *H04L 43/0817* (2013.01); *H04L 45/22* (2013.01)

(58) Field of Classification Search
CPC ..... H04L 45/28; H04L 43/0817; H04L 45/22; H04L 41/16
USPC ......................................................... 709/238
See application file for complete search history.

(56) References Cited

U.S. PATENT DOCUMENTS

| | | |
|---|---|---|
| 7,890,654 B1 | 2/2011 | Tadimeti et al. |
| 8,335,850 B2 | 12/2012 | Benedetto et al. |
| 8,625,460 B2 | 1/2014 | Dutt et al. |
| 9,838,317 B1 * | 12/2017 | Yadav ................ H04L 43/0829 |
| 10,033,623 B2 | 7/2018 | Jain et al. |
| 2005/0025075 A1 | 2/2005 | Putt et al. |
| 2007/0192474 A1 * | 8/2007 | Decasper .............. H04L 67/306 709/223 |
| 2018/0027004 A1 * | 1/2018 | Huang .................. H04L 63/162 726/23 |
| 2019/0281373 A1 * | 9/2019 | Sadasivarao ........ H04L 41/0226 |
| 2019/0297017 A1 * | 9/2019 | Pignataro ............ H04L 63/1425 |
| 2020/0344150 A1 * | 10/2020 | Vasseur ................... H04L 45/08 |
| 2020/0389371 A1 * | 12/2020 | Tedaldi .................. G06N 20/00 |
| 2021/0218635 A1 | 7/2021 | Cherrington et al. |
| 2023/0161838 A1 * | 5/2023 | Shriram ............. G06F 18/2115 382/159 |

FOREIGN PATENT DOCUMENTS

WO   WO-2021074701 A1 *   4/2021   .......... H04L 41/147

* cited by examiner

*Primary Examiner* — Meng Vang
(74) *Attorney, Agent, or Firm* — Baratta Law PLLC; Lawrence A. Baratta, Jr.

(57) ABSTRACT

Systems and methods are provided for predicting an impending change to Interior Gateway Protocol (IGP) metrics associated with Network Elements (NEs) in an optical network. A method, according to one implementation, includes receiving Performance Monitoring (PM) data related to an optical network having a plurality of links. The method also includes analyzing the PM data to predict the likelihood of an impending change to an IGP metric associated with a problematic link of the plurality of links.

16 Claims, 9 Drawing Sheets

PREDICTING IMPENDING CHANGE TO INTERIOR GATEWAY PROTOCOL (IGP) METRICS

TECHNICAL FIELD

The present disclosure generally relates to networking systems and methods. More particularly, the present disclosure relates to function-based techniques or machine-learning based techniques for predicting impending changes to IGP metrics in an optical network.

BACKGROUND

Generally, Interior Gateway Protocols (IGPs) are used for sharing routing information among a group of nodes in a network domain. For example, the domain may include a plurality of nodes and a plurality of links connecting the nodes together. IGP may also define how the routing information is configured in the nodes to allow them to efficiently transmit signals to other nodes within the domain. The paths or routes from one node to another may include direct transmission along one link from one node to an adjacent node or may include transmission requiring multiple "hops" along multiple links, passing through one or more intermediate nodes.

However, at times, a link may experience certain issues that can interrupt transmission. For example, a problematic link may cause unacceptable delays. In this case, network operators (e.g., Network Operations Center (NOC) personnel, administrators, network technicians, etc.) may recognize that the problematic link is causing issues and can therefore change the applicable configuration values of the nodes, such as by changing certain IGP metrics, in order to intentionally bypass this link. That is, the network operator may change an IGP metric representing a transmission "cost" to an arbitrarily high value to indicate to the nodes of the domain that transmitting along this problematic link is not worth the cost. As a result, this link is avoided and traffic is re-routed around the link. Then, when the underlying root causes of the previously detected issues appear to be resolved, the network operator can switch the artificially high value of the IGP metric back to its original value to allow traffic to flow through this link again.

As can be seen from this scenario, this IGP metric modifying process is reactive to the detection of issues of the problematic link and is usually performed after the link has already caused problems in the network domain. Also, modifying the IGP metric is a manual process that is performed by the network operator or other expert who needs to analyze the Performance Monitoring (PM) data received from various devices throughout the network domain.

Typically, static rules are used to configure the IGP metrics when certain PM data breaches a predetermined threshold. Workflows in network management systems and assurance applications may be used to manage and govern networks with an optical ability to automate IGP configurations based on errors, delays, priority, etc. associated with the links.

Usually, conventional systems require that the network operators performed these manual processes, which can be complex and time-consuming. Also, the IGP metric changing procedures may rely on hand-crafted static rules that might be unique to individual network operators or unique to the domain. At times, the knowledge of one NOC operator may need to be transferred to another NOC operator so that the domain can be managed consistently, even if the old rules are not the most optimized solutions. Again, these rules and procedures are typically applied only in a reactive manner, which means that even an expert network operate many not be able to act early enough before noticeable delays are experienced in the network. Hence, it should be noted that the conventional systems in this regard are prone to errors and hard to change or configure. Therefore, there is a need in the field of network routing protocols to improve the conventional systems with regard to the management or configurations of IGP metrics to predict when network operators may be likely to change the IGP metrics.

BRIEF SUMMARY

The present disclosure is directed to systems and methods for predicting impending changes or the likelihood of upcoming changes to an IGP metric, such as an IGP metric may be alter the traffic with respect to an optical link in an optical network. The systems and methods may include steps that can be performed by any suitable control or monitoring device associated with an Autonomous System (AS) or domain of a network. The steps may be embodied in a non-transitory computer-readable medium that is configured to store computer logic having instructions. When embodied in computer-readable media, the steps may enable or cause one or more processing devices to perform certain steps for predicting an impending change to one or more IGP metrics.

In one implementation, a process may include a first step of receiving Performance Monitoring (PM) data related to an optical network having a plurality of links. The process may also include a second step of analyzing the PM data to predict the likelihood of an impending change to an Interior Gateway Protocol (IGP) metric associated with a problematic link of the plurality of links.

According to some embodiments, the analyzing step may include predicting the likelihood that a network operator would manually change the IGP metric to intentionally divert network traffic away from the problematic link. The IGP metric may be associated with a cost or expense of using the problematic link. Also, the analyzing step may also include predicting the likelihood that the network operator would manually set the IG P metric to an arbitrarily high value.

In response to predicting the likelihood of the impending change, the process 80 may further include the step of predicting a possibility that the problematic link has underlying issues or has experienced some form of degradation. In some embodiments, the process may also include the step of utilizing a supervised Machine Learning (ML) model to analyze the PM data and predict the likelihood of the impending change to the IGP metric. The PM data, for example, may be optical layer data.

Furthermore, the process may also be defined where the step of receiving the PM data includes steps of a) receiving raw historical data from transponders of multiple optical edge devices across the IP and optical layers of the optical network, where each optical edge device includes at least one optical interface, b) stitching together the raw historical data from the multiple optical edge devices, and c) utilizing the stitched data to train a ML model adapted to predict the likelihood of the impending change to the IGP metric. The step of training the ML model may include using a sliding window, gradient boosted technique to identify changes to the IGP metric. The optical network may be configured to use a link-state routing protocol (e.g., IGP) that supports configuration of metrics for the plurality of links, wherein the IGP metric includes one or more of a default metric, a delay metric, an expense metric, and an error metric.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Figure 1:
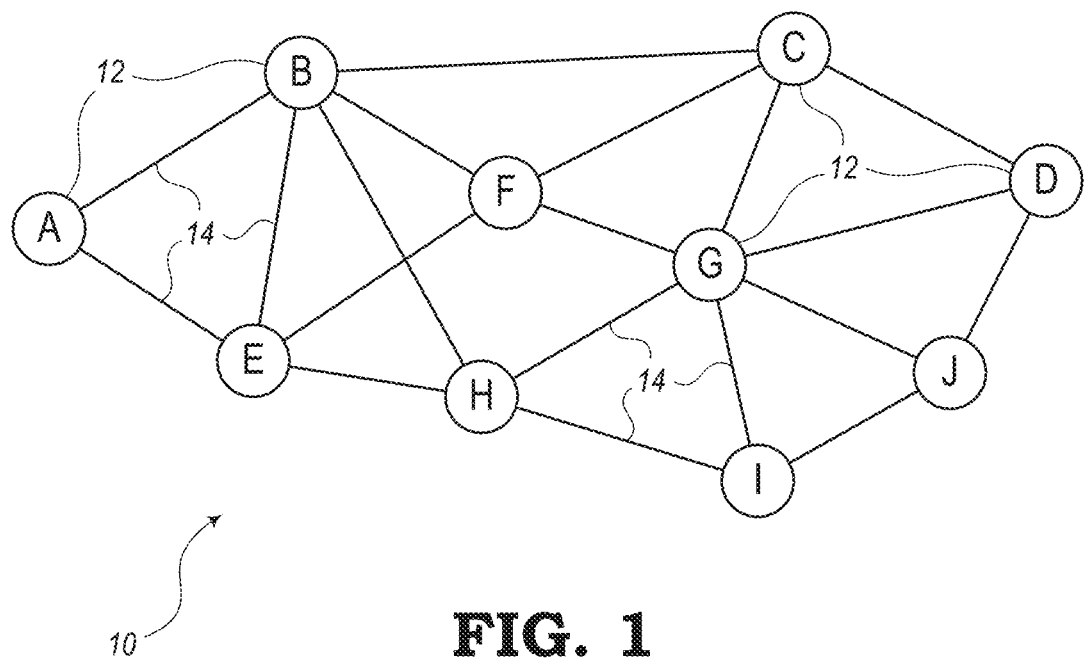
FIG. 1 is a diagram illustrating an autonomous system, according to various embodiments.

The present disclosure relates to systems and methods for predicting the likelihood that a network operator may change the Interior Gateway Protocol (IGP) metrics in a domain having a plurality of nodes and interconnecting links. In particular, the domain may be a portion of an optical network, whereby optical Performance Monitoring (PM) data may be obtained and then used for detecting the state of the optical network.

As mentioned above, a Network Operations Center (NOC) operator, network operator, network administrator, network engineer, network technique, etc. may manually adjust the IGP metrics stored with the routing information in the nodes of the network domain or Autonomous System (AS). These IGP metrics may be values or weights used for defining various PM features obtained during normal performance monitoring throughout the network. The IGP metrics may also be referred to as Intermediate System to Intermediate System (IS-IS) values or weights associated with the IS-IS routing protocol, which is a type of IGP. Also, the manual changes are made, for example, when there are problems at the optical layer.

Since the IGP weights may be used to route packets throughout the domain, certain IGP metrics (e.g., related to cost) may basically have two values: a) a relatively low value that is a true indication of the link cost during normal operation of the link, and b) an arbitrarily high value that the network operator may manually enter. By switching to the arbitrarily high value, the network operator essentially removes the link from route considerations.

The prediction or forecasting of these changes to the IGP metrics, as described in the present disclosure, are related to whether or not the network operator might normally make these changes, which may be based on historical data. Thus, by using Machine Learning (ML) models and/or rules-based techniques, procedures, or algorithms, the embodiments of the present disclosure can accurately predict the likelihood of the IGP metric being switched to the arbitrarily high value. By analyzing the optical layer PM data, the ML models (or rules-based algorithms) can accurately predict the possibility of reconfiguring of the IPG metrics.

Although the examples described throughout the present disclosure are related to datasets based on PM data obtained over whole days, it should be noted that the embodiments herein may be adapted to analyze PM data obtained over any suitable time periods, such as hourly, every 15 minutes, every 5 minutes, etc. As mentioned in further detail below, the implementations of ML models developed according to the present disclosure were found to have great success in achieving the goal of predicting changes in the IGP metrics. According to tests, the present implementations were able to provide statistically high "precision" and "recall" values, thereby resulting in high F1 values. For instance, the present systems and methods were tested and validated using real-world datasets, whereby a prototype of the present systems demonstrated an ability to predict upcoming IGP changes five days ahead with 95% precision and 75% recall.

The present implementations significantly improve over existing manual methods. The ML automation of the present disclosure for IGP change prediction allows for seamless and efficient network operations, translating to cost savings for the NOC and time savings for the network operators. Since the datasets were collected from a real production network, this may imply that the datasets suffer from missing data, data drifts, and a shortness of samples for normally detecting positive or true scenarios in which IGP changes actually take place. The ML-based methods of the present disclosure were found to be able to handle this noisy data and accurately predict those IGP changes by combining feature engineering and supervised ML techniques.

Autonomous System

FIG. 1 is a diagram illustrating an embodiment of an autonomous system (AS) 10 (e.g., domain, enterprise system, etc.) of an optical network. The AS 10 includes a plurality of nodes 12 (i.e., Nodes A-J) interconnected with each other by a plurality of links 14. The nodes 12 may be referred to as Network Elements (NEs), routers, switches, etc. As illustrated, the nodes 12 and links 14 of the AS 10 are arranged in a mesh configuration.

The nodes 12 may be configured to preform various types of routing protocols to share routing information with other nodes 12. In this way, routes or paths may be determined for enabling communication between any pair of nodes 12 in the AS 10. These routes or paths may include the transmission of packets over one or more links 14. The paths can be computed to minimize the time that it takes for the packets to be transmitted between pairs of nodes 12 and to meet other criteria.

One group of routing protocols is the Interior Gateway Protocol (IGP), which includes the exchanging of routing information between gateways (e.g., nodes 12) within the AS 10. The routing information can then be used to route network-layer protocols, such as Internet Protocol (IP). IGP may be divided into two categories: distance-vector routing protocols and link-state routing protocols. For example, link-state routing protocols may include Open Shortest Path First (OSPF) and Intermediate System to Intermediate System (IS-IS). While these protocols are related to communication within the AS 10 itself, the nodes 12 in the AS 10 may also communicate with other nodes outside the AS 10 using exterior gateway protocols.

The routes or paths may be defined in routing tables (or routing information bases) in the nodes 12 or routers. The routing table may list the routes to any particular destination nodes 12 in AS 10. In some cases, the IGP metrics may be associated with "distance" parameters, "cost" parameters, etc. that classify the specific links. Also, the routing tables may contain information about the network topology of the AS 10. The construction of these routing tables is essentially the primary goal of routing protocols, such as IGP. In IGP, each link may be given a particular metric that defines the distance or cost for communication along the respective link.

Optical Link

Figure 2:
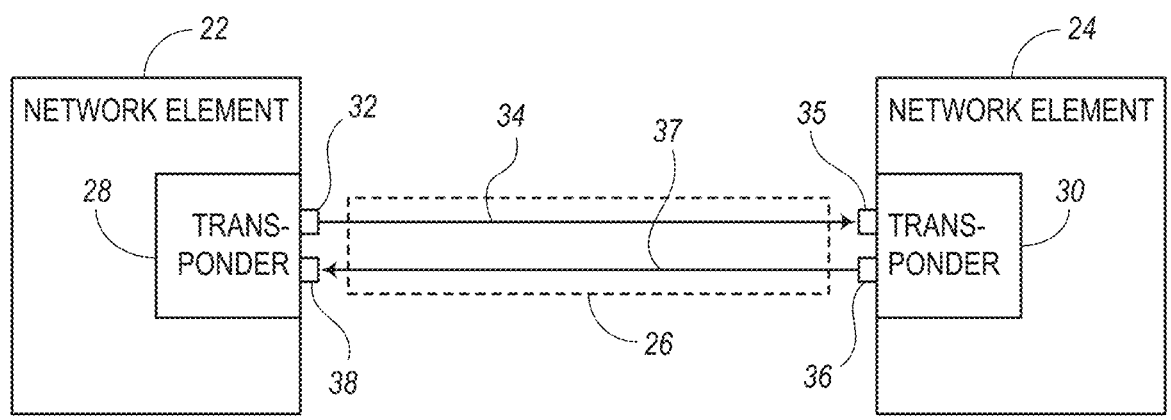
FIG. 2 is a block diagram illustrating a portion of the autonomous system of FIG. 1 including an optical link between two network elements, according to various embodiments.

FIG. 2 is a block diagram illustrating a portion of the AS 10, including a first Network Element (NE) 22 (e.g., a first node 12) connected to a second NE 24 (e.g., a second node 12) via an optical link 26 (e.g., link 14). The first NE 22 includes a transponder 28 that is configured to communicate with a transponder 30 of the second NE 24. The transponder 28 of the first NE 22 is configured to transmit optical signals from a port 32 along a first fiber 34 to a port 35 of the transponder 30 of the second NE 24. Likewise, the transponder 30 of the second NE 24 is configured to transmit optical signals from a port 36 along a second fiber 37 to a port 38 of the transponder 28 of the first NE 22.

Primarily, PM data is obtained from optical ports or interfaces (e.g., ports 32, 35, 36, 38) for gathering optical parameters that may be useful for determining the state of the AS 10 and predicting impending changes to the IGP metrics. Therefore, the embodiments of the present disclosure include systems and methods to automatically predict or forecast upcoming IGP changes. The predicting procedures may involve the use of ML-based methods trained with data stitched from various network devices (e.g., NEs 22, 24) across both the Internet Protocol (IP) Layer and the Optical Layer. The optical PM data obtained from the optical layer from ports or interfaces of the NEs 22, 24 may be preferred, although PM data in the IP layer may also be useful as well.

Referring again to conventional systems, it may be noted that exploration of IGP changes typically involves a top-down approach to identify underlying issues. The top-down approach might start with a signature of problematic links and try to forecast upcoming traffic metrics or recommend IGP configuration values to set on the links. The conventional systems do not use automated processes, but only allow the manually configuring of the IGP metrics. The IGP change analysis and detection process is conducted manually and often requires a domain expert. Moreover, the analysis performed is sometimes very subjective and varies from user to user.

However, in contrast to the conventional top-down approach, the embodiments of the present disclosure may be referred to as using a bottom-up approach. For example, it would be helpful if systems were to detect upcoming configurations by looking at the raw metrics being reported by PM systems across the network. One such example demonstrates a motivation for developing the present embodiments, that is, to identify underlying flapping links.

Flapping links are links that go down multiple times a day, causing reroutes and, ultimately, noticeable delays by the users. To avoid this, the client (e.g., network operator) might set high IGP metrics on the flapping links in order to divert traffic away from the links. Other problematic links are configured with high IGP metrics whenever an issue is detected and then can be reset to normal levels once the correct resolution procedure is carried out. Hence, the present disclosure is configured to see if the metrics themselves are indicative of an upcoming change which could, in turn, hint at the possibility of degrading health for a specific link.

The Intermediate System to Intermediate System (IS-IS) protocol is an IGP link-state routing protocol with areas, adjacencies, and databases. IS-IS uses Dijkstra's shortest path algorithm to find the optimal path and then builds and saves the link states in a database. IS-IS also supports the metric configuration of links to govern the links' behavior. In some embodiments, there may be four different measured values:

a) default metrics, where every interface is configured with a default metric of some constant value;

b) delay metrics, which are a function of delay or congestion associated with the links;

c) expense metrics, which are a function of the operating expenses of the links; and d) error metrics, which are a function of error packet proportions.

The network operators may use these metrics as well as more complex metric configuration options. In some embodiments, however, the data may be collected under a manual configuration environment where NOC operators only modify the "default metric" to resolve underlying link issues. It should be noted that any suitable combination of one or more metrics may be used and are still applicable since the ML models detection of root cause issues may be learned regardless of the action triggering mechanism.

Referring again to FIG. 2, the illustrated portion of the network (or AS 10) shows the single link 26. The NEs 22, 24 may be Layer 2 switches or Layer 3 routers. These NEs 22, 24 may be connected via packet-optical devices. In some embodiments, the transponder ports 32, 35, 36, 38 of the NEs 22, 24 and the transponder ports of the intermediate packet-optical devices may be consider in the analysis of the state of the AS 10. In other words, according to some embodiments, the amplifiers and/or repeaters of the intermediate packet-optical device may not be considered in the performance monitoring stages. The present methods may be more broadly applicable to other link topologies, such as dark fibres, long Ethernet IP connections, etc.

Since the embodiments of the present disclosure were developed as a result to studies based on real data, the development process was presented with a slew of challenges when exploring, cleaning, and pre-processing the data. For instance, for some of the intermediate packet-optical devices, only data for one of the transponder ports could be found. This could have happened due to a topology change or error during data collection. Also, with zero suppressed data, the studies were based on a sparse dataset. Another challenge came from the imbalance of the dataset. Since the data during development was collected from a stable backbone transport network, there were only a limited number of changes that occurred during a test week. According to these statistics, the testing process was only able to obtain about 50 positive samples to infer valuable insights.

General Computing System

Figure 3:
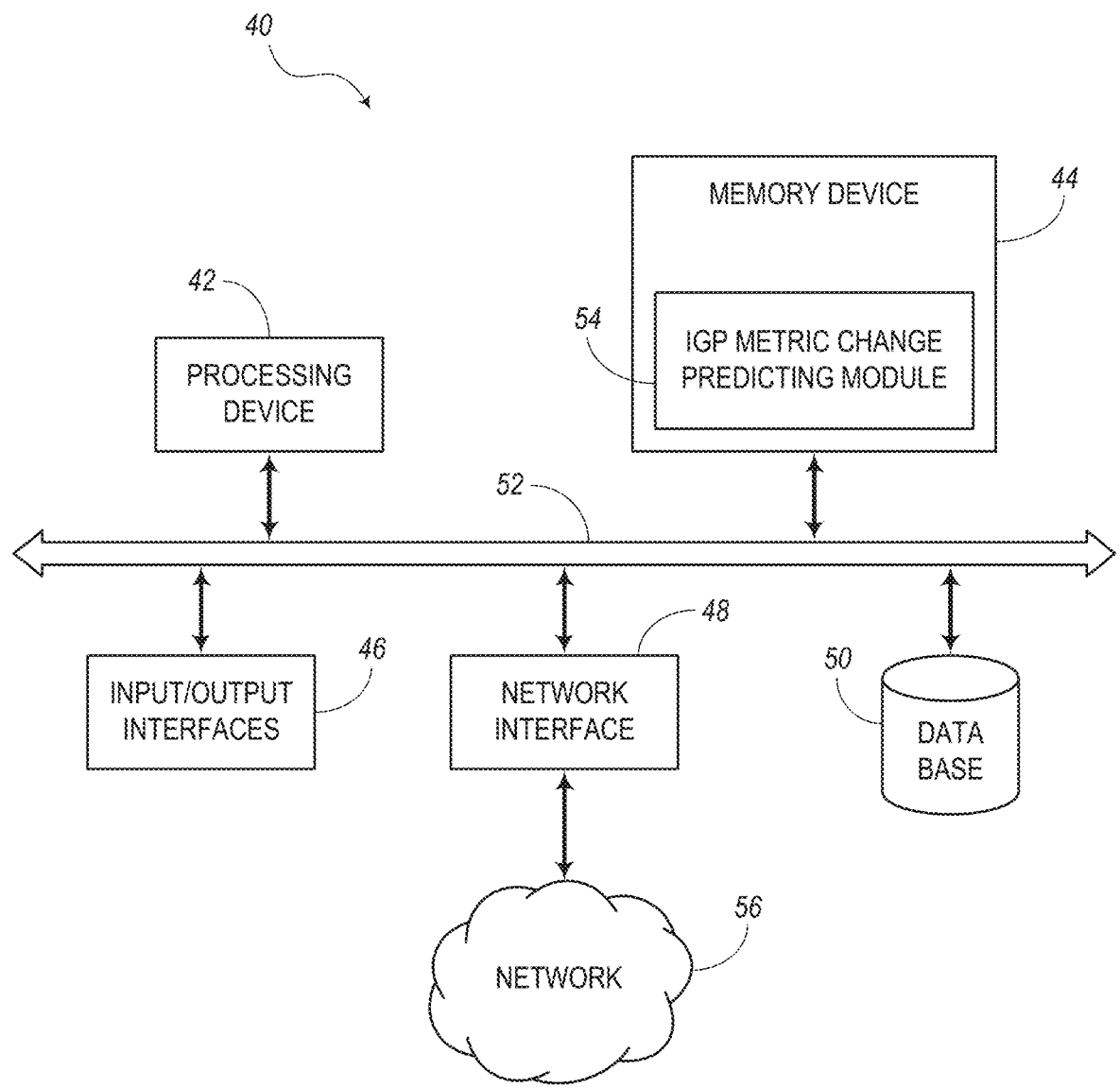
FIG. 3 is a block diagram illustrating a computing system of a network element configured in the autonomous system of FIG. 1 for predicting impending changes to an Interior Gateway Protocol (IGP) metric, according to various embodiments.

FIG. 3 is a block diagram illustrating an embodiment of a computing system 40 configured to predict impending changes to an IGP metric of a node or NE. The computing system 40 may be part of a node 12, NE, router, switch, or other components in a network, domain, AS, etc. In the illustrated embodiment, the computing system 40 may be a digital computing device that generally includes a processing device 42, a memory device 44, Input/Output (I/O) interfaces 46, a network interface 48, and a database 50. It should be appreciated that FIG. 3 depicts the computing system 40 in a simplified manner, where some embodiments may include additional components and suitably configured processing logic to support known or conventional operating features. The components (i.e., 42, 44, 46, 48, 50) may be communicatively coupled via a local interface 52. The local interface 52 may include, for example, one or more buses or other wired or wireless connections. The local interface 52 may also include controllers, buffers, caches, drivers, repeaters, receivers, among other elements, to enable communication. Further, the local interface 52 may include address, control, and/or data connections to enable appropriate communications among the components 42, 44, 46, 48, 50.

In some embodiments, the computing system 40 may further include an IGP metric change predicting module 54, which may be implemented in any suitable combination of software or firmware that may be stored in the memory device 44 and hardware that may be implemented in the processing device 42. The IGP metric change predicting module 54 may be configured to receive PM data related to an optical network having a plurality of links. Also, upon receiving this PM data, the IGP metric change predicting module 54 may be configured to analyze the PM data to predict the likelihood of an impending change to an IGP metric associated with a problematic link of the plurality of links.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Figure 4:
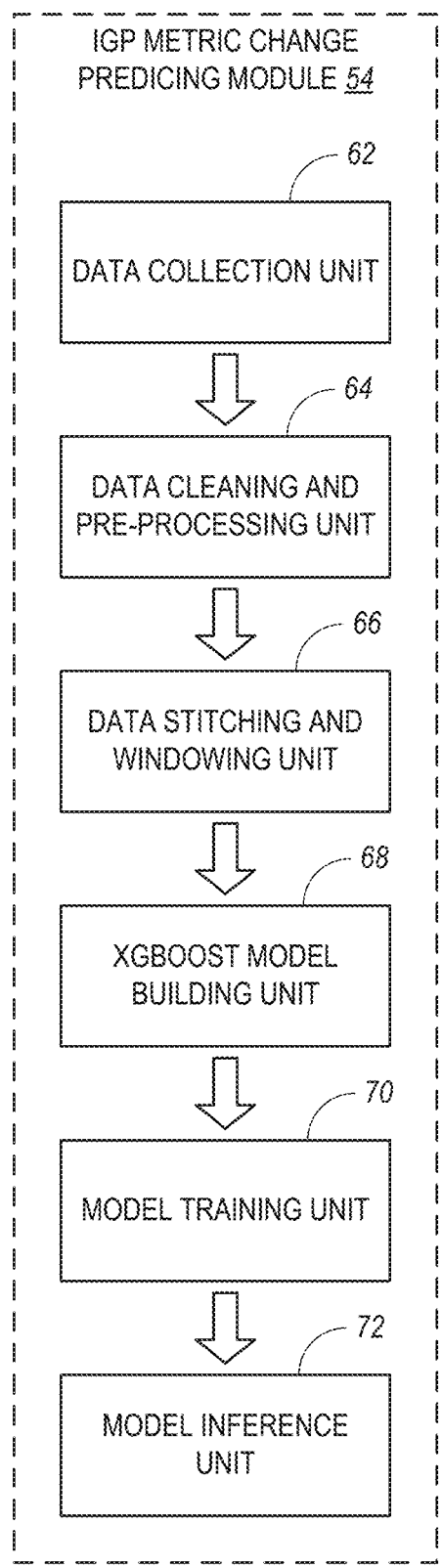
FIG. 4 is a block diagram illustrating features of the IGP metric change predicting module shown in FIG. 3, according to various embodiments.

FIG. 4 is a block diagram illustrating an embodiment of the IGP metric change predicting module 54 shown in FIG. 3. In this embodiment, the IGP metric change predicting module 54 includes a data collection unit 62, a data cleaning and pre-processing unit 64, a data stitching and windowing unit 66, an XGBoost model building unit 68, a model training unit 70, and a model inference unit 72.

Data Collection

The data collection unit 62 may be configured to collect data from multiple sources. For example, during testing, three different data collection products provided by three different vendors were utilized. One challenge with collecting data from multiple sources, however, is that if can be difficult at times to be able to cross-reference these data sources. The systems and methods of the present disclosure were developed by taking a closer look at the data manually to see how it could be stitched together to form a consolidated dataset on which exploratory analysis could be done. However, before that, the development process had to work with the data coming from these three sources individually and do some exploration before trying to combine the data with information from other sources.

Data Cleaning and Preprocessing

The data cleaning and pre-processing unit 64 was developed by following best practices for cleaning and preprocessing datasets. Since it may be necessary to deal with a sparse dataset that has a lot of missing values, especially optical PM data, the data cleaning and pre-processing unit 64 is configured to specifically treat the data in order that the data may be useable. A closer look at the data and discussions with domain expertise we were able to identify some reasons for the volume of missing data from the dataset. They are listed below.

A. Random Missing Data

This kind of data is attributed to a normal cause for missing data. For example, crashes, communication errors, or any other system glitches may cause the data to be missing randomly. The cleaning and pre-processing unit 64 is configured to do things to treat randomly missing data, such as using k-Nearest Neighbor (k-NN) algorithms to impute data missing between data points that are not missing.

B. Zero suppression

Zero suppression may be another cause of a sparse dataset. As discussed above with respect to the three different data collection products, a first one, by design, was not configured to report PM data if there were no updates or if there were nothing to report for certain features. The data cleaning and pre-processing unit 64 is configured to work with this feature of this first product.

C. Domain Specific Missing Values

Some of the features from the first product were inter-related in a way that if one of the features is reported for a time period of interest (e.g., a specific day) for that port in general, then the other PM data is not reported at all. This could be because this first product support multiple types of interfaces on multiple types of optical devices. For example, if HCCS is greater than zero, then Q-MIN, OTUQ-MAX, OTUQ-AVG, OTUQ-STDEV will all be "Not a Number" (NaN) entries. The data cleaning and pre-processing unit 64 is configured to treat this case by filtering out entries where this situation could happen.

D. Missing Values due to Labelling

Sometime features may be randomly labelled in special ways but could represent the same metric. For example, the features E-INFRAMES and E-OUTFRAMES could be labelled INFRAMES-E and OUTFRAMES-E, respectively. Although the reason for this may be unclear, the data cleaning and pre-processing unit 64 may be configured to handle these labelling issues as well.

E. Missing Values due to Nature of Interface

The nature of the interface may also be an important aspect in the kind of features that the first product reports for it. For example, interfaces that are facing the line (e.g., optical link) may have optical features reported for them. However, a data record for this interface may also include columns representing features for interfaces facing the client's Layer 3 or Layer 2 device and these will all be NaN entries. The same is true for interfaces facing the Layer 3 or Layer 2 devices themselves in that the columns representing features from line side interfaces will all be NaN entries. This can be treated by the data cleaning and pre-processing unit 64 by leveraging a metadata column called meta_facility. According to field experts, if meta_facility is "ETH-100G," then the port is found to be facing the client device. Otherwise, if it is "OTM," then it is facing the line (or optical link). The data cleaning and pre-processing unit 64 can then replace NaNs with zeros for the respective features that will always be NaN.

Given the above situations, the data cleaning and pre-processing unit 64 may be configured to do some preprocessing to decrease the number of NaNs. A first process may include filtering the dataset based on features that are selected by domain expertise. The second process may include filtering the data for test time intervals (e.g., days) that have data without gaps. In experimentation, one date range during one test was from Jun. 6, 2022 to Aug. 28, 2022. This filtering removes the uncertainty that could lie with the unavailability of data from other data sources (e.g., a second product used in the testing phase). Doing this filtering can make the preprocessing logic consistent between the different data source products used. The data cleaning and pre-processing unit 64 may also include logic to stitch inter-related metrics together and load missing features from related metrics that have data. This is used to reduce the number of NaNs due to "C—Domain Specific Missing Values" and "D—Missing Values due to Labelling" as discussed above.

Data Stitching and Windowing

The data stitching and windowing unit 66 is the next step in the IGP metric change predicting module 54. The data stitching and windowing unit 66 is configured to combine all of the data from the various (e.g., three) data sources together using link IDs. Then, the data stitching and windowing unit 66 is configured to partition the dataset into a 5-day rolling window data frames. The labeling strategy is already mentioned in the methodologies section.

Building an XGBoost Model

The XGBoost model building unit 68 is configured to build an XGBoost model with parameters selected to optimize for the current dataset. Some of the optimized parameters may include: a) loss function, b) maximum number of trees, c) maximum depth, d) positive to negative ratio, etc. All of these may be picked after experimentation.

Model Training

The model training unit 70 of the IGP metric change predicting module 54 is configured to perform supervised learning algorithms to train a ML model. The supervised training may be based on an historic training set. In some embodiments, various grading boosting algorithms and classification algorithms may be used, although the XGBoost algorithm may usually be preferred. The model training unit 70 may be able to train a ML model in as little as about 5 minutes on the full date range available. In trials, training took only a few minutes for the data in the Jun. 6, 2022 to Aug. 28, 2022 date range.

Model Inference

The model interference unit 72 is configured to utilize the trained ML model created in the model training unit 70. In the tests, the inference was done on the test set, whereby a precision/recall curve was inspected, as well as a "feature importance" plot that showed the features that were determined to have the best results. The model interference unit 72 is configured to do more repeated trials, by randomizing the training every time to bootstrap the datasets and get the spread of the F1 scores.

General Process for Predicting Impending Changes to IPG Metrics

Figure 5:
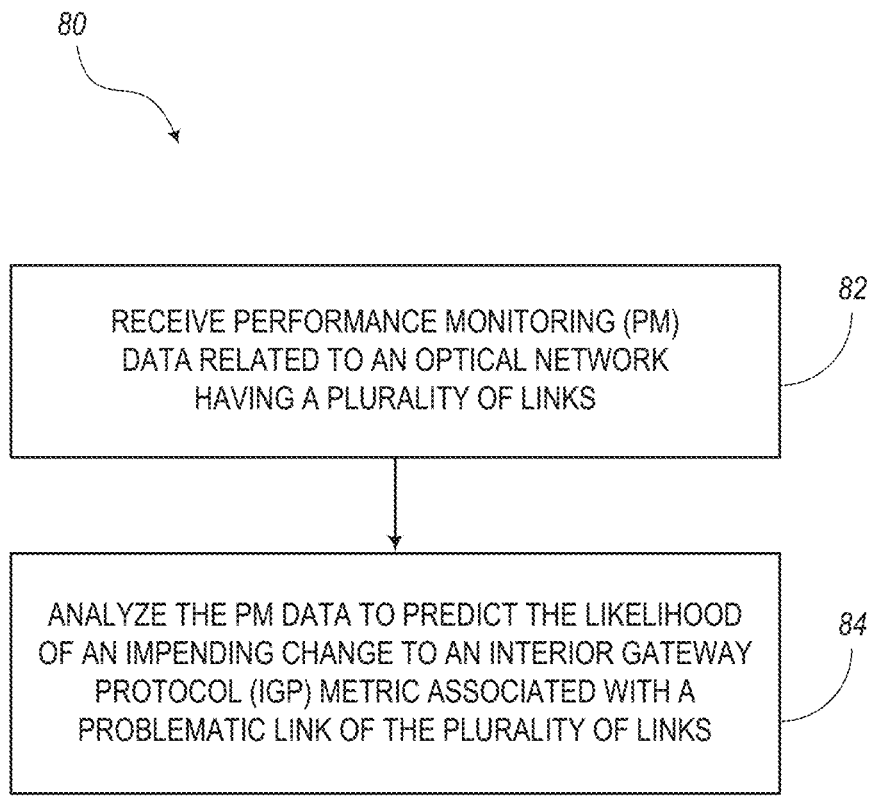
FIG. 5 is a flow diagram illustrating a process for predicting impending changes to an IGP metric, according to various embodiments.

FIG. 5 is a flow diagram illustrating an embodiment of a process 80 for predicting impending changes to an IGP metric. For example, the process 80 may include steps that can be performed by any suitable monitoring device associated with the AS 10. For example, the process 80 may be performed by one of the nodes 12, one of the NEs 22, 24, the computing system 40 (e.g., with assistance from the IGP metric change predicting module 54), or any control or monitoring device within the AS 10, outside the AS 10, in a control plane associated with the AS 10, etc. The process 80 may embodied in a non-transitory computer-readable medium that is configured to store computer logic having instructions. When embodied in computer-readable media, the process 80 may enable or cause one or more processing devices (e.g., the processing device 42) to perform certain steps for predicting an impending change to one or more IGP metrics.

As illustrated in FIG. 5, the process 80 includes a first step of receiving Performance Monitoring (PM) data related to an optical network having a plurality of links, as indicated in block 82. The process 80 also includes a second step of analyzing the PM data to predict the likelihood of an impending change to an Interior Gateway Protocol (IGP) metric associated with a problematic link of the plurality of links, as indicated in block 84.

According to some embodiments, the analyzing step (block 84) may include predicting the likelihood that a network operator would manually change the IGP metric to intentionally divert network traffic away from the problematic link. The IGP metric may be associated with a cost or expense of using the problematic link. Also, the analyzing step (block 84) may also include predicting the likelihood that the network operator would manually set the IGP metric to an arbitrarily high value.

In response to predicting the likelihood of the impending change, the process 80 may further include the step of predicting a possibility that the problematic link has underlying issues or has experienced some form of degradation. In some embodiments, the process 80 may also include the step of utilizing a supervised Machine Learning (ML) model to analyze the PM data and predict the likelihood of the impending change to the IGP metric. The PM data, for example, may be optical layer data.

Furthermore, the process 80 may also be defined where the step of receiving the PM data (block 82) includes a first step of receiving raw historical data from transponders of multiple optical edge devices across the IP and optical layers of the optical network, where each optical edge device includes at least one optical interface, a second step of stitching together the raw historical data from the multiple optical edge devices, and a third step of utilizing the stitched data to train a ML model adapted to predict the likelihood of the impending change to the IGP metric. The step of training the ML model may include using a sliding window, gradient boosted technique to identify changes to the IGP metric. The optical network may be configured to use a link-state routing protocol (e.g., IGP) that supports configuration of metrics for the plurality of links, wherein the IGP metric includes one or more of a default metric, a delay metric, an expense metric, and an error metric.

Production-grade enterprise networks are usually built by combining Local Area Networks (LANs) to form Wide Area Networks (WANs), which are then connected by a backbone of optical submarine lines. These enterprise client may have an extensive amount of data on these large networks. The data can be collected, for example, by various data collection products, as mentioned above. The relevant data that may be used in the embodiments described in the present disclosure may include data that might normally be obtained from data centers, Software-Defined Networking (SDN) systems, Network Function Virtualization (NFV) systems, and/or cloud-based service systems.

The collected data can show the historical footprint of the interfaces in the network, as well as the effect of router configuration actions with respect to various control metrics, such as IGP metrics. From the equipment in the AS 10 or network, PM data, metrics, and configuration data can be collected, for example, in hourly and daily bins, giving rise to a large amount of data with a wealth of information on which trials can be run for optimizing the training of the ML prediction systems and for running the prediction techniques on real-world data using trained ML models. The use case studied in the trials was motivated by the problem of manually having to configure the IGP metrics (e.g., costs, weights, etc.) on a NE spread on a worldwide transport network.

The data collection unit 62 data may be configured to securely collect data from the client's private network. During testing, the data may be anonymized. Various tools and technologies may be used in the data collection process. One driver may be configured to connect to database servers and extract information from files on the disk. Another process may collect information and dump it into a click house table. Finally, some scripts may be configured to run daily to organize and structure the data before it gets exported for analysis.

Data Source Products

Again, the data collection was performed in the testing using three main components, generally referred to herein as a first data source product, a second data source product, and a third data source product. For example, the first product was able to offer a comprehensive solution to manage optical networks that span metro and core domains. The first product may be part of a network management system that brings visibility and control of services and infrastructure. It can bin optical PM data and alarms daily and save them in a Postgres database. Alarms, for example, may be events raised by the crossing of manual set thresholds.

The second product is a network design, planning, and simulation tool to visualize and optimize enterprise networks. Some of its main features are visibility, predictive "what if" analysis, capacity planning, and path routing optimization. The data acquired in the testing phase included IP-level metrics (e.g., throughput, packet count, error counts, and Central Processing Unit (CPU) and memory utilization, etc.) at the interface level. Although the second product could collect data more frequently than over a one day time interval, the was stored by the day before it was exported by the collection scripts. Data was collected from remote nodes via known protocols, such as Simple Network Management Protocol (SNMP) and Border Gateway Protocol—Link State (BGP-LS).

The third product was also used in the testing phase for developing the systems and methods of the present disclosure. The third product provided another source of data that was used in the study. The third product was responsible for capturing metrics of IP interfaces made available to it every hour and exporting them in JSON format. Some metrics it captures were IGP metric, TE metric, unidirectional minimum delay, maximum reservable bandwidth, and maximum link bandwidth. The third data source product also was able to periodically export metrics through files or long living Hyper Text Transfer Protocol (HTTP) connection. The data collected in this study is only done through files as the client's security team did not allow long-living connections to any of their servers.

In addition to these three products, another source data was used during the experimental study for developing systems and methods for training ML model to predict impending changes to IGP metrics. This addition source included static Excel files shared by the clients. These include details about the topology and files from the static tables of the first, second, and third data source products, containing details about chassis, shelf, slot, and port of specific interfaces. Some of these files were not as frequently updated, which were found to be difficult.

Referring again to FIG. 4, the data stitching and windowing unit 66 of the IGP metric change predicting module 54 performs the data stitching procedure to collect all the available data together into a usable form. Then, the "windowing" portion of this process may include a sliding-window, gradient-boosted approach to analyze and identify IGP changes to build a system that generalizes well to new changes on new links that could potentially be comprised of different vendors and from different layers of the network. The present disclosure may therefore focus on selecting important optical metrics, including IGP changes, in a previous window to identify changes in a current window. Such a method seems to identify the majority of manual IGP configuration changes with a reasonable confidence interval.

The way this may be done in the present disclosure is that the IGP metric change predicting module 54 may be configured, using units 62 and 64, to collect, clean, and preprocess the data from the three data source products listed above. This dataset should include all the feature columns from all data sources, such as, for example, link ID, timestamps, and other essential metadata columns for interface identification. In the present disclosure, the IGP metric change predicting module 54 may be configured not to impose any constraints on the value of the features. Since the systems can deal with sparse datasets, the process of dropping "Not a Number" (NaN) data (i.e., missing data values) might wipe out most of the dataset, which would be disadvantageous. Therefore, instead of dropping this NaN data points, the data cleaning and pre-processing unit 64 may be configured to replace them with constant values. In addition, the data stitching and windowing unit 66 is configured to organize this data into daily bins and stitch them together to form one whole dataset.

The final dataset is partitioned into five-day sliding window frames with a stride value of one day. A label for the current window is determined by looking at the next five-day window to determine if there was a positive IGP change in any of the days. If so, the label will be one (1). Otherwise, it will be zero (0). To make things more efficient, the data stitching and windowing unit 66 is configured to slide the window from the earliest to the latest timestamp, do the labelling based on the current window's IGP values, and then shift the labels to the left to get the final labels. To avoid the probability of mislabeling the final sample, the data stitching and windowing unit 66 can drop the sample instead of padding it with a zero. This method results in a three-dimensional dataset with the first axis being the number of samples, the second features, and the last the number of days. The dimensions of the input datasets were 15153×149×5.

Experimentation to Test Effectiveness of Proposed Solutions

It can be seen that one important engineering task that may be performed by the XGBoost model building unit 68 is the addition of the TE metric (e.g., a generalized form of the IGP metric) from the current window as a feature. This feature specifies whether there is a recent change in progress, which, as confirmed in the results, will increase the probability of an upcoming or impending IGP change. The model used may be XGBoost, which is an optimized distributed gradient boosting library with built-in methods for loss computation and parameters for handling class imbalance. To use this three-dimensional dataset with XGBoost, the XGBoost model building unit 68 may further be configured to flatten the training samples from the three-dimensional datasets to two-dimensional datasets, by separating out the "day" dimension. So, a training sample for the model will have a feature column for each day in the five-day window.

In the testing phase, the class imbalance was found to be about 1%. This means that only 1% of the 15153 samples were positive examples. This class imbalance ratio is passed as a parameter to the XGBoost model so that it adjusts the weights of the classifier accordingly.

Regarding the model training unit 70, the systems were able to use stratified splits at a ratio of 65% training data to 35% testing data. The stratified samples ensured that the true distributions of the class imbalance were reflected in the testing dataset as in reality and the training dataset.

F1 scores and average precisions were used to determine the performance of the models trained in this study. In some experiments, average accuracy was referenced by fixing the recall value. However, in analysis, the F1 score was considered as it generalizes the precision and recall together via harmonic mean computation. Finally, paired two-tailed t-tests may be used to calculate statistical significance when comparing the distribution of performance scores of two models.

Based on experimentations, it was found that a ML model could effectively be used to identify upcoming IGP changes. It was also found that it was instrumental to obtain optical PM data for the building of the ML model and for inference. The optical PM data can be collected when reported from the transponder interfaces on edge optical devices from real network topologies with devices in IP and Optical layers. Regarding the use of optical PM data, the relevance of optical metrics in the model's decision was found to effectively predict an upcoming or impending IGP change. Optical performance monitoring may be one component of long-haul optical telecommunication systems.

Test Results

A positive result from the various testing phases may be essential to demonstrate that the systems and methods of the present disclosure can operate effectively and can provide an improvement over conventional systems. For example, the processing of certain metrics (e.g., IGP metrics) may be important in predicting an impending IGP change. Also, positive test results justify the collection of additional information for providing assistance for the NOC operators to make informed decisions. In some case, however, additional testing may be performed to determine how much data is enough and when collecting more optical metrics is not required for decision making. In this case, the systems and methods may determine when there is no longer a need to allocate additional resources to collect and store the additional data until a client may request to receive more data when needed.

The results of various testing phases for developing the systems and methods of the present disclosure are shown in the graphs and charts of FIGS. 6-11. Given the cleaned and windowed data, the best gradient boosted model had a precision of 95% at a recall of 75%, which can be utilized in the present systems and methods. This best model tested to provide an average F1 score of 0.8 and an Area Under the Curve (AUC) value of 0.772. A five-fold cross-validated model performance is demonstrated in the figure.

Figure 6:
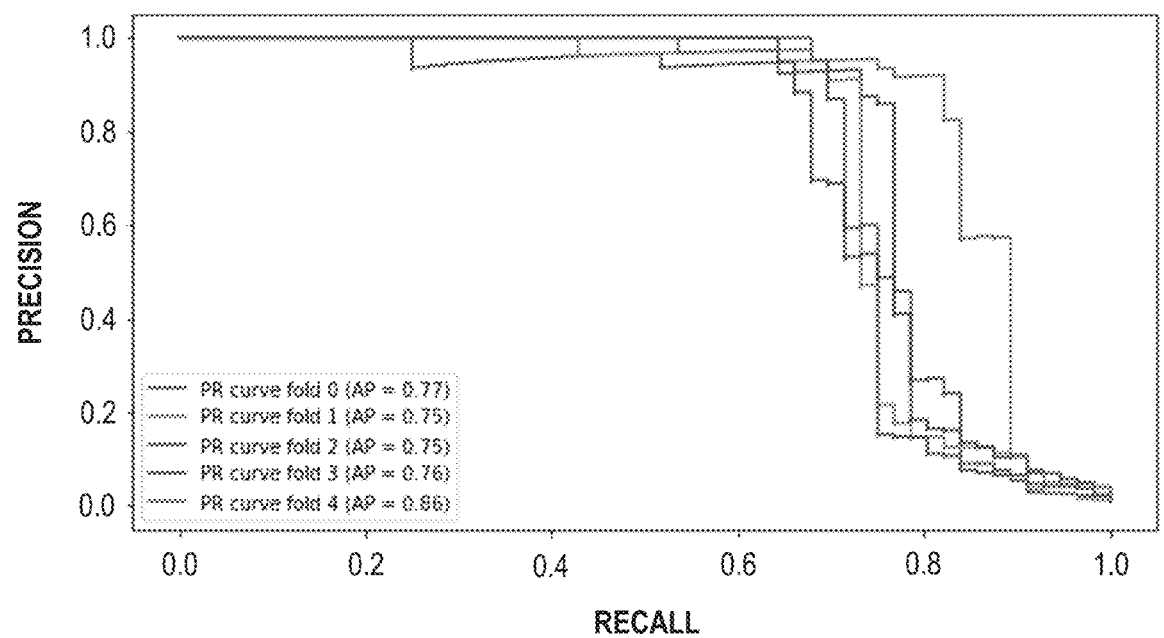
FIG. 6 is a graph illustrating precision-recall curves associated with the results of a Machine Learning (ML) model using all available link data, according to one example.

FIG. 6 is a graph illustrating a cross-validated Precision-Recall (PR) curve for IGP change detection. The PR curves may be associated with the results of a ML model using essentially "all" of the available link data. As can be seen, this model gives a good performance result. Five-fold cross-validation was picked after manually experimenting with the appropriate number of folds. As it turned out, five-fold gave the proper balance between ratio of training data and testing data. As can be seen from the five-fold cross-validation, precision has an average well between ranges of 95-100%. However, recall has a wider range of 70-90%. This may be due to the low number of positive samples that were in the dataset. The data was trained on "all" links found in the topology using all of the available features.

Figure 7:
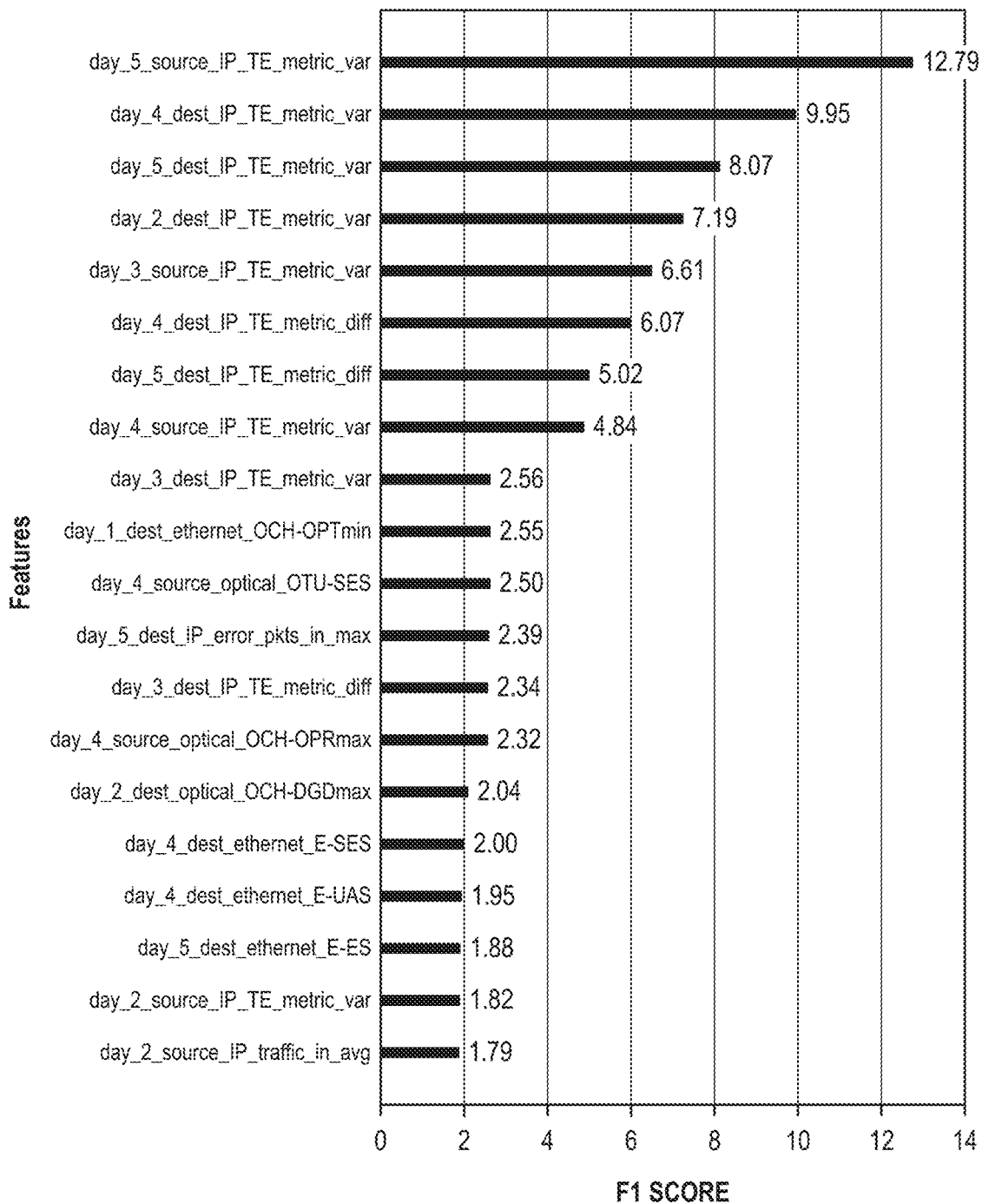
FIG. 7 is a chart illustrating the importance of network features when utilizing the ML model described with respect to FIG. 6, according to one example.

FIG. 7 is a chart illustrating the importance of various network features in the creation of the ML model described with respect to FIG. 6. The chart of FIG. 7 shows the feature importance plots of the model that achieved the results in FIG. 6. This plot is only generated for the top 20 features, since the rest may be viewed as being not as important in the decision making process. It can be seen that the top feature in this example is "day_5_source_IP_TE_metric_var," which may be variable of an IP metric or TE metric obtained by a source node on day 5 in the five-day window. The parameter used to determine the importance of each feature in this case is the F1 score. In this example, the day_5_source_IP_TE_metric_var feature was found to have an F1 score of 12.79.

From FIG. 7, it can be seen that although the top-most features are related to the "TE metric" features in the 5-day sliding window, there are some important "optical" features as well in the top 20 features. Since the TE metrics are very high in the sorted list of important features, it may seem that they are the only relevant ones. However, it was further found, as explained below, that the optical metrics were also important in at least two ways, with the addition and removal of the constituent features by training the same model on links that have optical interfaces.

First, the data was prepared by filtering it for links that have at least one optical interface. Note that links typically have four optical interfaces (e.g., ports 32, 35, 36, 38), but some links could be represented by fewer ports due to missing data. For this first approach, the same model can be trained with this data, except the optical features are removed to obtain the results shown in FIG. 8. The other approach is to train the same model on this data with the optical features included to obtain the results shown in FIG. 10. The results of the model are demonstrated from the first approach and the feature importance plots in FIGS. 8 and 9, respectively.

Figure 8:
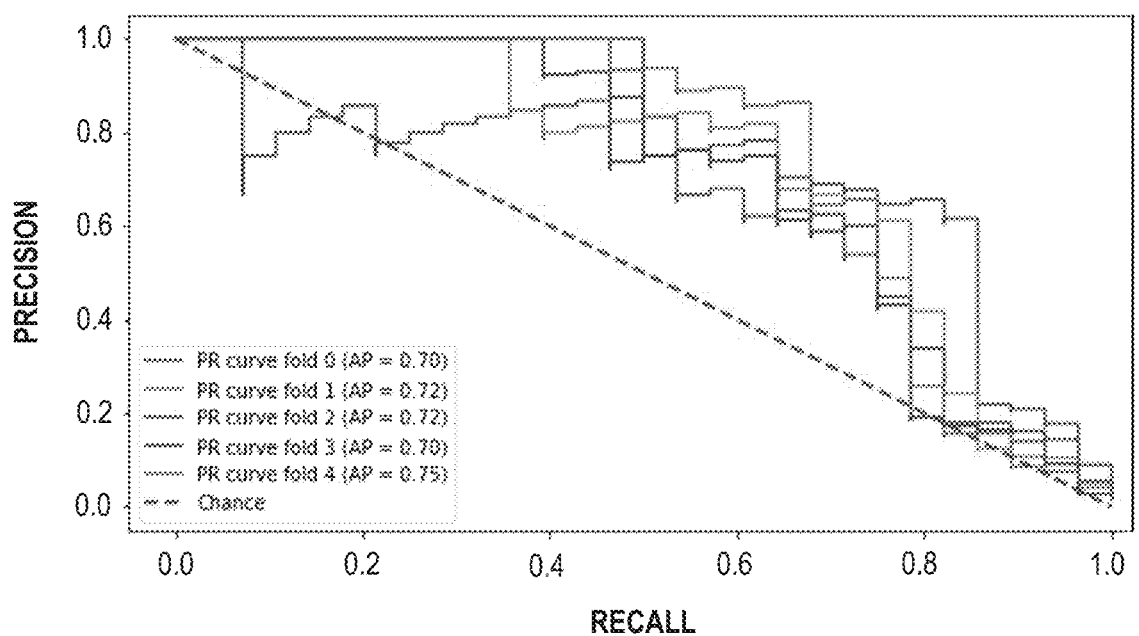
FIG. 8 is a graph illustrating precision-recall curves associated with the results of a Machine Learning (ML) model using no optical Performance Monitoring (PM) data, according to one example.
Figure 9:
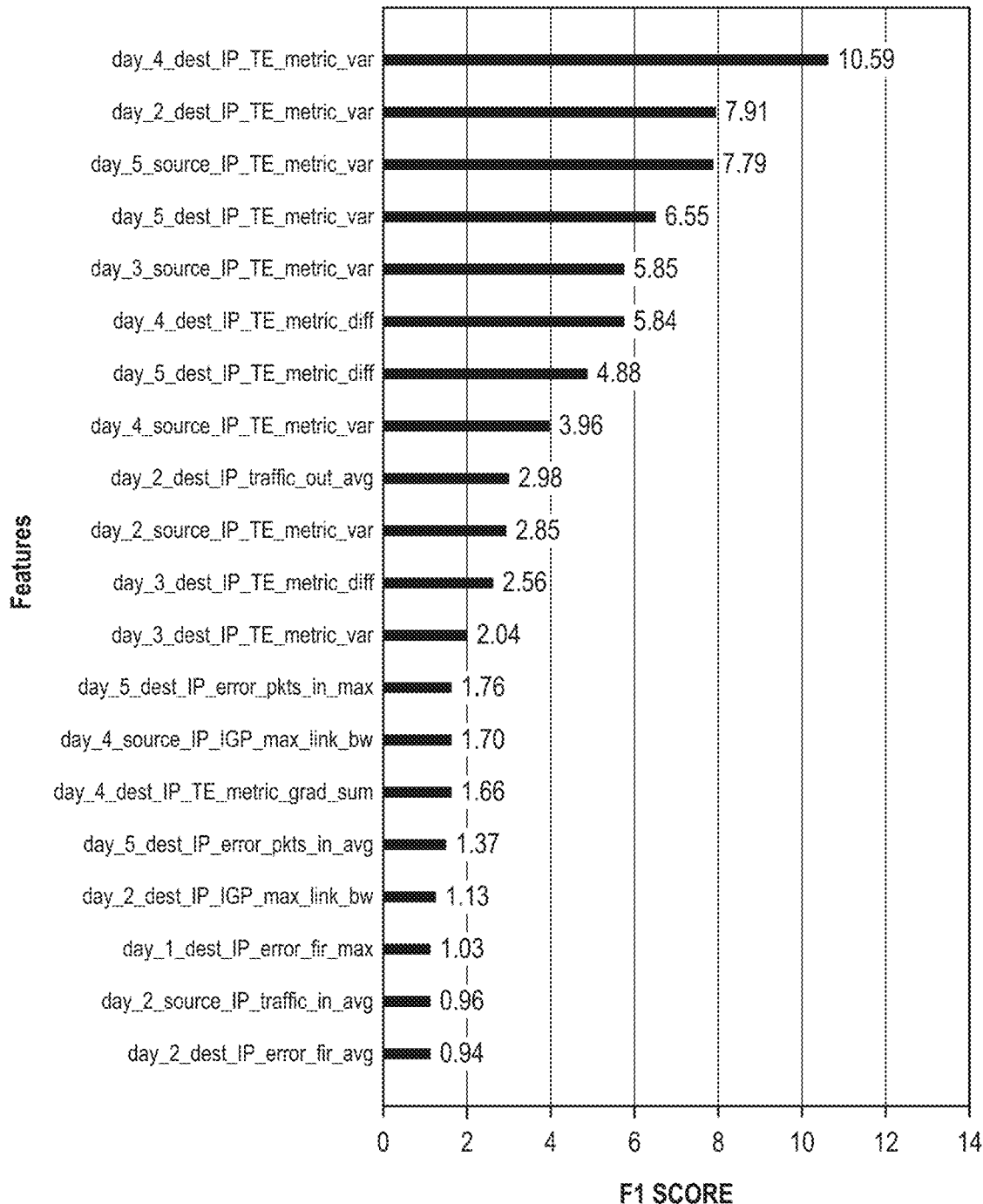
FIG. 9 is a chart illustrating the importance of network features when utilizing the ML model described with respect to FIG. 8, according to one example.

FIG. 8 is a graph showing an example of the model performance with "no optical PM data" and illustrates the Precision-Recall (PR) curves associated with the results of a Machine Learning (ML) model using no optical PM data. FIG. 9 is a chart illustrating the importance of various network features when utilizing the ML model to obtain the results of FIG. 8.

From FIGS. 8 and 9, it can be seen that the performance of the model has an average precision of about 72% and that there are no dominant optical metrics that show up on the feature importance plot. From the model that was trained on all links and all metrics (e.g., the results of which are shown in FIG. 6), which has an average precision score of 78%, this is about a 6% decline in performance. However, as mentioned above, this comparison is not applicable since the type of links in this second model (e.g., the results of which are shown in FIG. 8) are links that have at least one optical interface. Hence a true comparison would be to the performance of the model that resulted from another approach as demonstrated in the results of FIG. 10.

Figure 10:
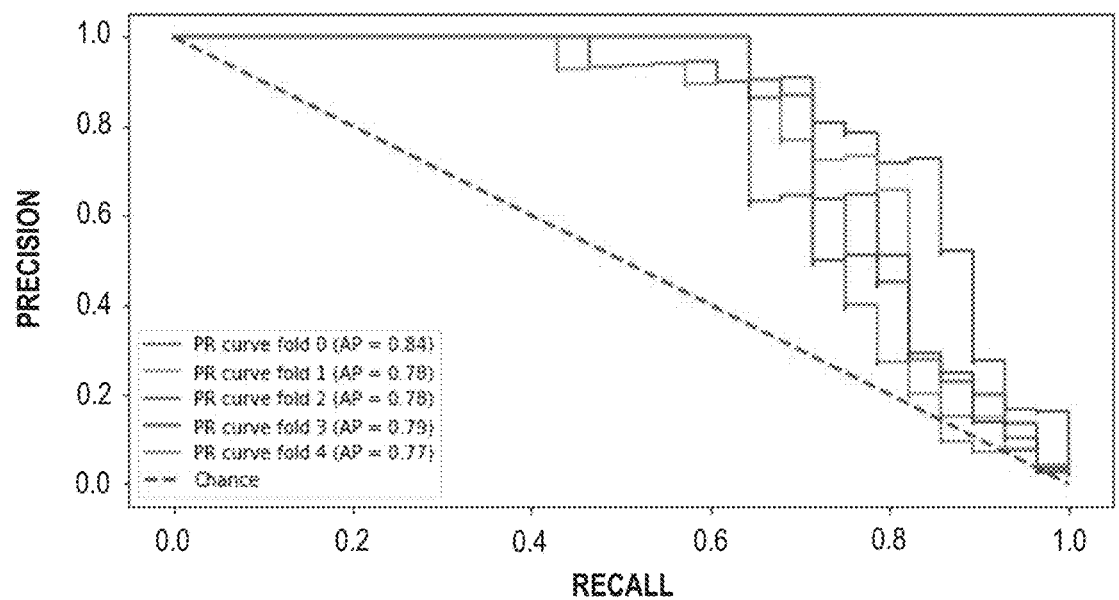
FIG. 10 is a graph illustrating precision-recall curves associated with the results of a Machine Learning (ML) model using PM data taken from optical links having at least one optical interface, according to one example.

FIG. 10 is a graph illustrating the result of a model trained on "links with at least one optical interface" and shows the PR curves associated with the results of such a ML model using PM data taken from these optical links having at least one optical interface. From FIG. 10, it can be seen that the model's performance has an average precision of about 79% and that dominant optical metrics show up on the feature importance plot of FIG. 11. The feature importance plots are very similar to those shown in FIG. 6. From the model trained on all links and all metrics (FIG. 8), which has an average precision score of 78%, this is only about a 1% increase in performance. However, from the first approach to testing the importance of optical metrics, it can be seen that the results from operating the ML model on this dataset (e.g., optical links with at least one optical interface) provides an increase of about 7%.

Since removing optical metrics is the only thing that changed between the two experiments, it can be concluded that the absence of optical metrics account for this performance degradation. Note that the importance of optical metrics is best reflected on links with at least one optical interface. To this end, adding links that have no optical interface was found to lead to additional noise in this study. This is shown when the model is trained on data from links that have optical interfaces. To see the relevance of optical metrics, the performance of the model increased by about 1% compared to the original result demonstrated in FIG. 6, portraying results from all links and all metrics.

Analysis

Figure 11:
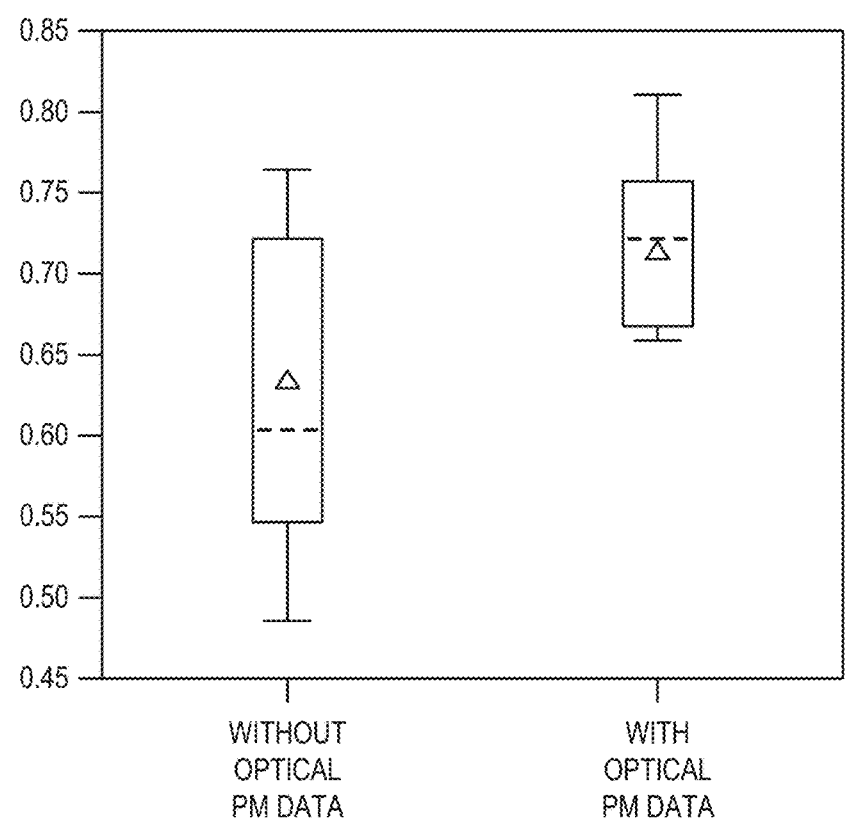
FIG. 11 is a chart comparing the F1 score results for the ML models described with respect to FIGS. 8 and 10, according to one example.

From these various tests, the results may be analyzed to determine their significance. Although average precision score is considered, it should be realized that both precision and recall may be essential for this use case. This is because it is desirable to predict all upcoming changes without raising as many false positives. A good metric to combine the precision and recall is the F1 score since it is a harmonic mean. The tests include five-fold cross-validated results, but these need to be repeated over random samples to confirm the consistency of the model. For this purpose, the same experiments were repeated three times. FIG. 11 demonstrates the spread of the F1 score from these three experiments.

FIG. 11 is a chart comparing the F1 scores over the three tests and includes a spread for the stratified five-fold cross-validated results using the developed ML model on the data obtained from optical devices in which data is available at one or more interfaces.

The triangles on the plot of FIG. 11 shows the mean for each condition, where the first condition is running the ML model without optical PM data and the second condition is running the ML model with optical PM data. The dashed lines of each set indicate the median values. From these results, we can see that there is visibly improved performance with the inclusion of the optical PM data for predicting IGP changes. This is because the levels of the median values have about a 10% difference.

Also, to statistically determine if the two results are significantly different from each other, a two-tailed paired t-test was performed. The null hypothesis is that there is no significant difference, which translates to the two models performing roughly the same with and without the presence of optical PM data. We set a P-Value of 5%, which may also be referred to as the significant value. From the test, a statistic value of −2.56 resulted and a P-Value of 0.02 resulted. Since 0.02 is less than the significant value, the null hypothesis was rejected. The conclusion is that the optical PM data does indeed make a significant change in the prediction of IGP changes in this topology.

It is believed that the features of the systems and methods described in the present disclosure are novel and are not provided in conventional systems. Also, it is believed that the embodiments of the present disclosure provide an improvement over the conventional systems. The present disclosure can uniquely combine various data sources to predict upcoming changes to IGP metrics by looking at historical data and processing the data with high precision. The embodiments may use ML models to learn relationships between data features in a way that is not obvious to network operators or others skilled in this technical field. The embodiments may leverage all metrics from both IP and Optical layers to predict upcoming IGP changes. Also included is a novel use of optical metrics from the underlying transport networks and leveraging them with IP layer metrics to further improve the performance of the ML models.

CONCLUSION

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A non-transitory computer-readable medium configured to store computer logic having instructions that, when executed by one or more processing devices, cause the one or more processing devices to perform the steps of
receiving Performance Monitoring (PM) data related to an optical network having a plurality of links where the PM data is from an optical layer and gathered from optical ports or interfaces on network elements in the optical network, and the PM data is a dataset of optical parameters thereon over suitable time periods,
analyzing the PM data with a supervised Machine Learning (ML) model to predict a likelihood of an impending change to an Interior Gateway Protocol (IGP) metric associated with a problematic link of the plurality of links, wherein the IGP metric is from a network-layer protocol at Layer 2 or Layer 3 that is different from and operates over the optical layer, wherein the supervised ML model is trained to analyze the PM data at the optical layer to predict changes in the IGP metric at the network-layer protocol, and
providing, to a Network Operations Center (NOC) that monitors the optical network, the likelihood of the impending change to the IGP metric, to indicate to a NOC operator to investigate an underlying root cause of issues or degradation on the problematic link in the optical network based on the prediction of the impending change to the IGP metric in the network-layer protocol.

2. The non-transitory computer-readable medium of claim 1, wherein the analyzing step includes predicting the likelihood that the IGP metric is changed to intentionally divert network traffic away from the problematic link.

3. The non-transitory computer-readable medium of claim 2, wherein the IGP metric is associated with a cost or expense of using the problematic link, and wherein the analyzing step includes predicting the likelihood that the IGP metric is changed to an arbitrarily high value higher than an original value.

4. The non-transitory computer-readable medium of claim 1, wherein, in response to predicting the likelihood of the impending change, the instructions further cause the one or more processing devices to perform the step of predicting a possibility that the problematic link has underlying issues or has experienced degradation.

5. The non-transitory computer-readable medium of claim 1, wherein the supervised ML model is trained with the steps of
receiving raw historical data from transponders of multiple optical edge devices across the optical layer of the optical network along with associated IGP metrics, each optical edge device including at least one optical interface,
stitching together the raw historical data from the multiple optical edge devices, and
utilizing the stitched data to train the supervised ML model.

6. The non-transitory computer-readable medium of claim 5, wherein training the ML model includes using a sliding window, gradient boosted technique to identify changes to the IGP metric.

7. The non-transitory computer-readable medium of claim 1, wherein the optical network uses a link-state routing protocol of IGP that supports configuration of metrics for the plurality of links, and wherein the IGP metric includes one or more of a default metric, a delay metric, an expense metric, and an error metric.

8. A method comprising the steps of:
receiving Performance Monitoring (PM) data related to an optical network having a plurality of links where the PM data is at an optical layer and gathered from optical ports or interface on network elements in the optical network, and the PM data is a dataset of optical parameters thereon over suitable time periods;
analyzing the PM data with a supervised Machine Learning (ML) model to predict a likelihood of an impending change to an Interior Gateway Protocol (IGP) metric associated with a problematic link of the plurality of links, wherein the IGP metric is from a network-layer protocol at Layer 2 or Layer 3 that is different from and operates over the optical layer, wherein the supervised ML model is trained to analyze the PM data at the optical layer to predict changes in the IGP metric at the network-layer protocol; and
providing, to a Network Operations Center (NOC) that monitors the optical network, the likelihood of the impending change to the IGP metric, to indicate to a NOC operator to investigate an underlying root cause issues or degradation on the problematic link in the optical network based on the prediction of the impending change to the IGP metric in the network-layer protocol.

9. The method of claim 8, wherein the analyzing step includes predicting the likelihood that the IGP metric is changed to intentionally divert network traffic away from the problematic link.

10. The method of claim 9, wherein the IGP metric is associated with a cost or expense of using the problematic link, and wherein the analyzing step includes predicting the likelihood that the IGP metric is changed to an arbitrarily high value higher than an original value.

11. The method of claim 8, further comprising, in response to predicting the likelihood of the impending change, the step of predicting a possibility that the problematic link has underlying issues or has experienced degradation.

12. A system comprising:
a processing device including one or more processors, and
a memory device configured to store a computer program having instructions that, when executed, enable the processing device to
receive Performance Monitoring (PM) data related to an optical network having a plurality of links where the PM data is at an optical layer and gathered from optical ports or interfaces on network elements in the optical network, and the PM data is a dataset of optical parameters thereon over suitable time periods,
analyze the PM data with a supervised Machine Learning (ML) model to predict a likelihood of an impending change to an Interior Gateway Protocol (IGP) metric associated with a problematic link of the plurality of links, wherein the IGP metric is from a network-layer protocol at Layer 2 or Layer 3 that is different from and operates over the optical layer, wherein the supervised ML model is trained to analyze the PM data at the optical layer to predict changes in the IGP metric at the network-layer protocol, and provide, to a Network Operations Center (NOC) that monitors the optical network, the likelihood of the impending change to the IGP metric, to indicate to a NOC operator to investigate an underlying root cause of issues or degradation on the problematic link in the optical network based on the prediction of the impending change to the IGP metric in the network-layer protocol.

13. The system of claim 12, wherein the IGP metric is associated with a cost or expense of using the problematic link, and wherein analyzing the PM data includes predicting the likelihood that the IGP metric is changed to an arbitrarily high value higher than an original value to intentionally divert network traffic away from the problematic link.

14. The system of claim 12, wherein the supervised ML model is trained by receiving raw historical data from transponders of multiple optical edge devices across the optical layer of the optical network along with associated IGP metrics, each optical edge device including at least one optical interface, stitching together the raw historical data from the multiple optical edge devices, and utilizing the stitched data to train the supervised ML model.

15. The system of claim 14, wherein training the ML model includes using a sliding window, gradient boosted technique to identify changes to the IGP metric.

16. The system of claim 12, wherein the optical network uses a link-state routing protocol of IGP that supports configuration of metrics for the plurality of links, and wherein the IGP metric includes one or more of a default metric, a delay metric, an expense metric, and an error metric.

* * * * *